B. M. BEACH.
INTERNAL COMBUSTION ENGINE.
APPLICATION FILED NOV. 7, 1917.
1,300,916.
Patented Apr. 15, 1919.
5 SHEETS—SHEET 4.
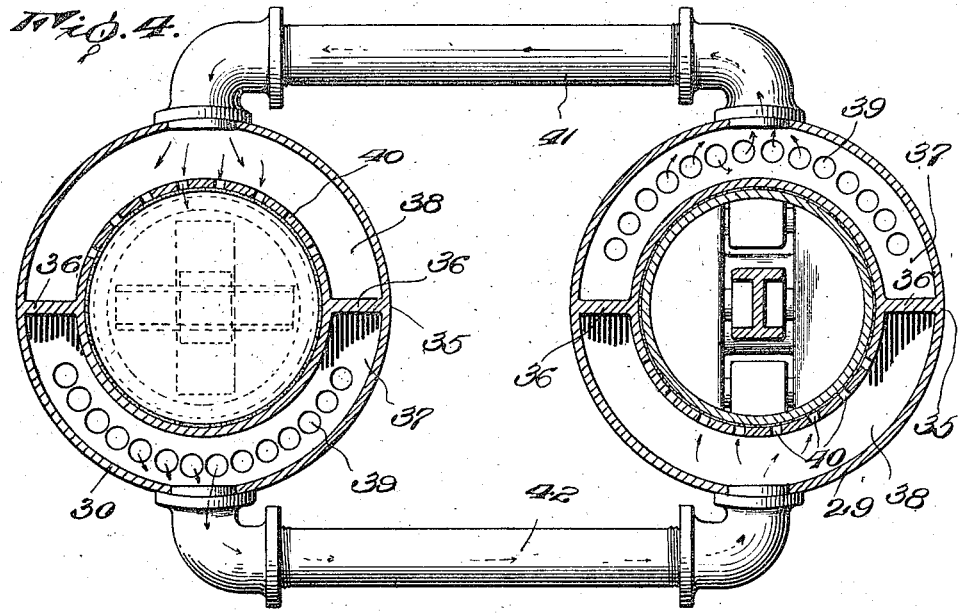
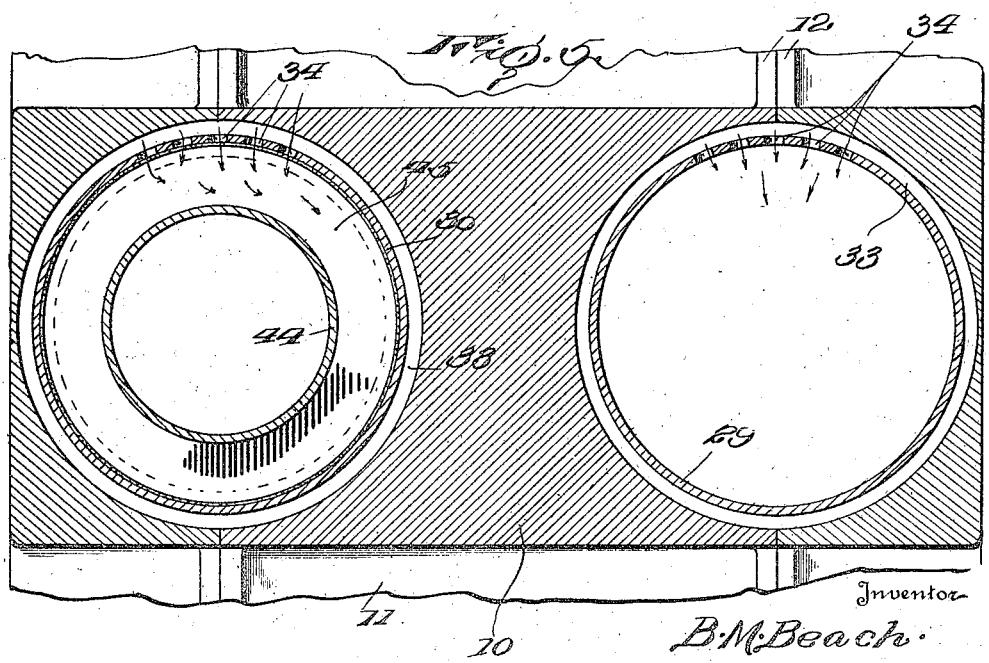

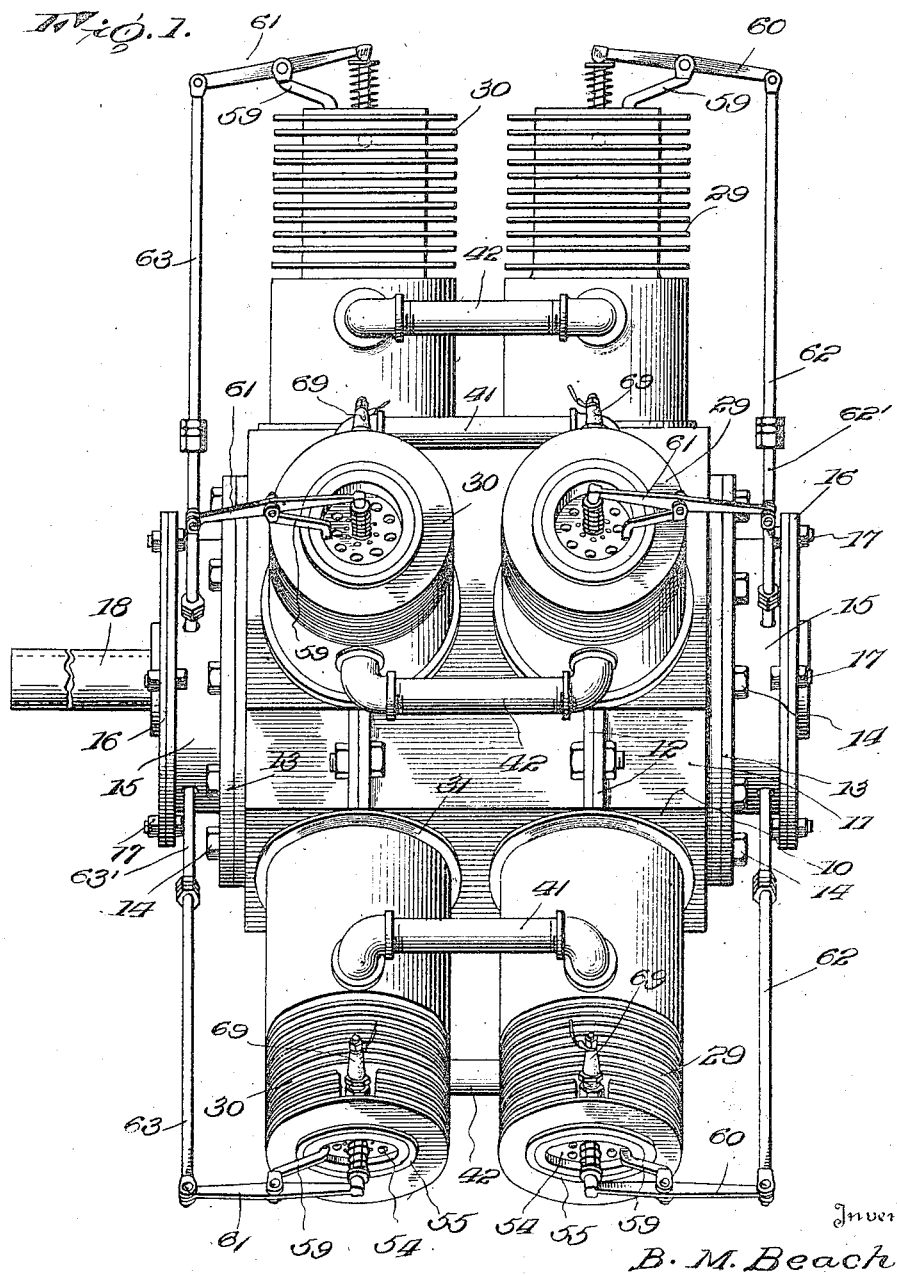

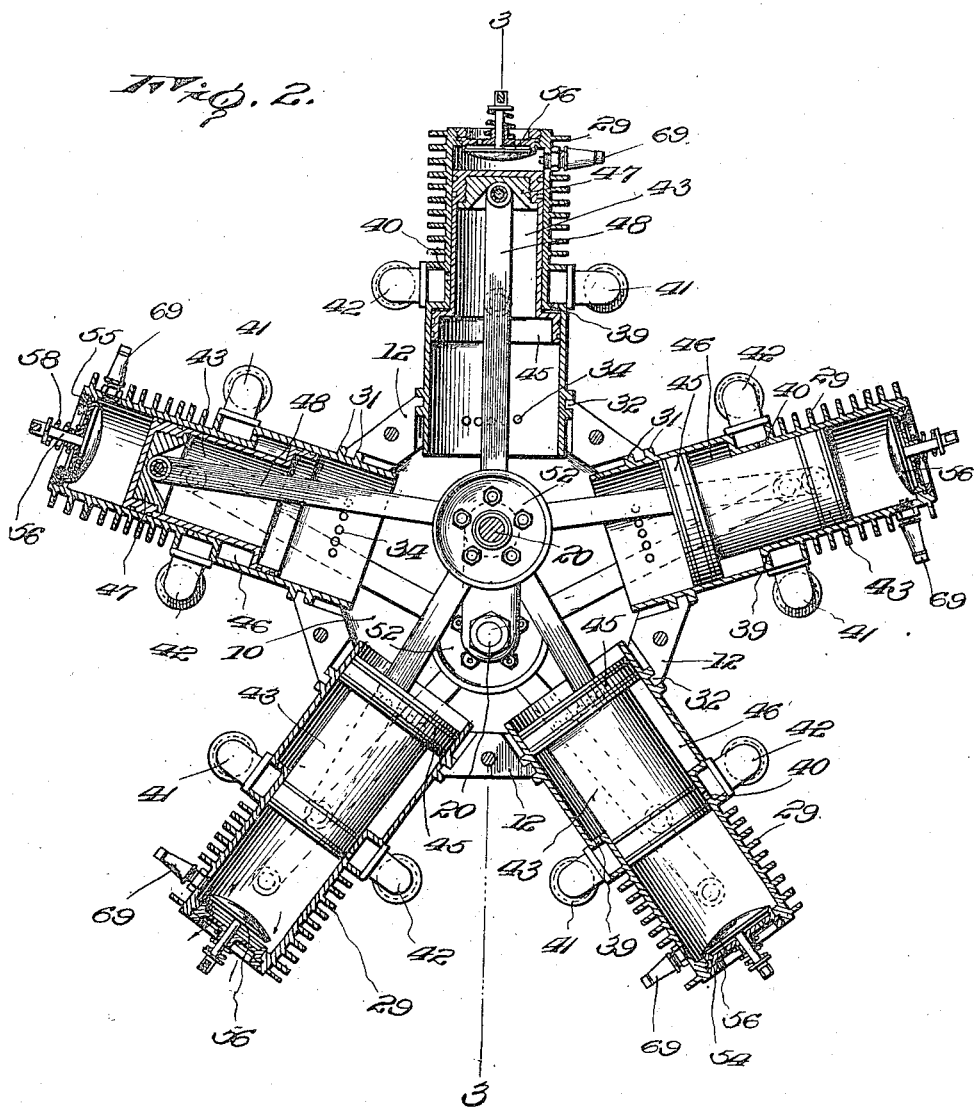

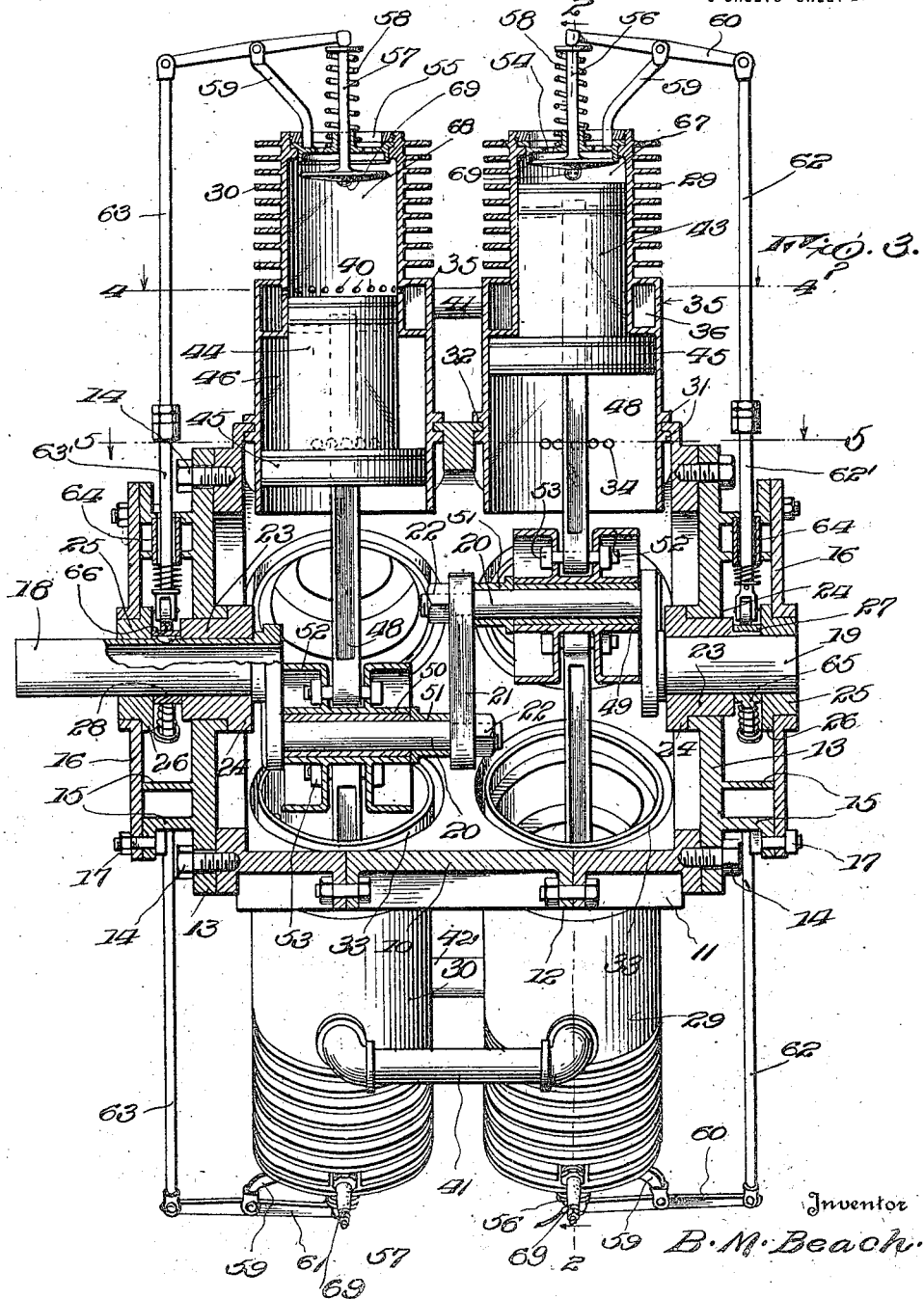

B. M. BEACH.
INTERNAL COMBUSTION ENGINE.
APPLICATION FILED NOV. 7, 1917.
1,300,916.
Patented Apr. 15, 1919.
5 SHEETS—SHEET 5.
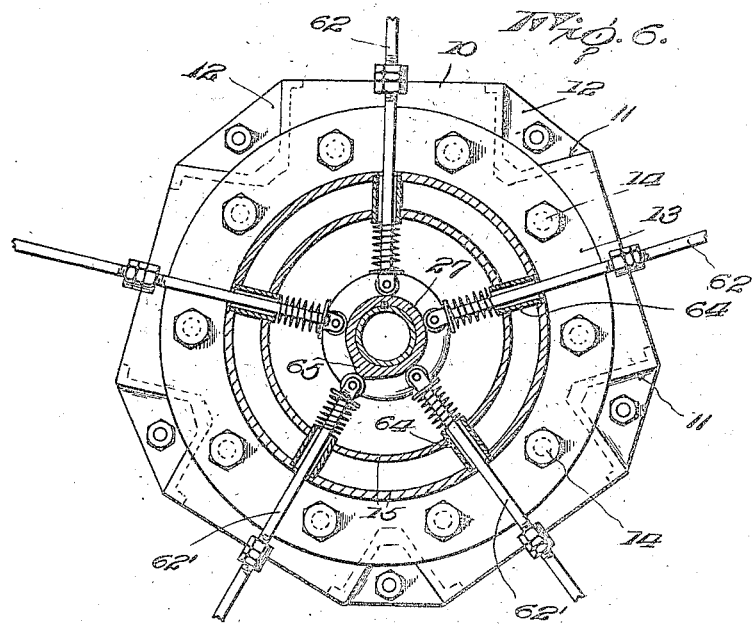
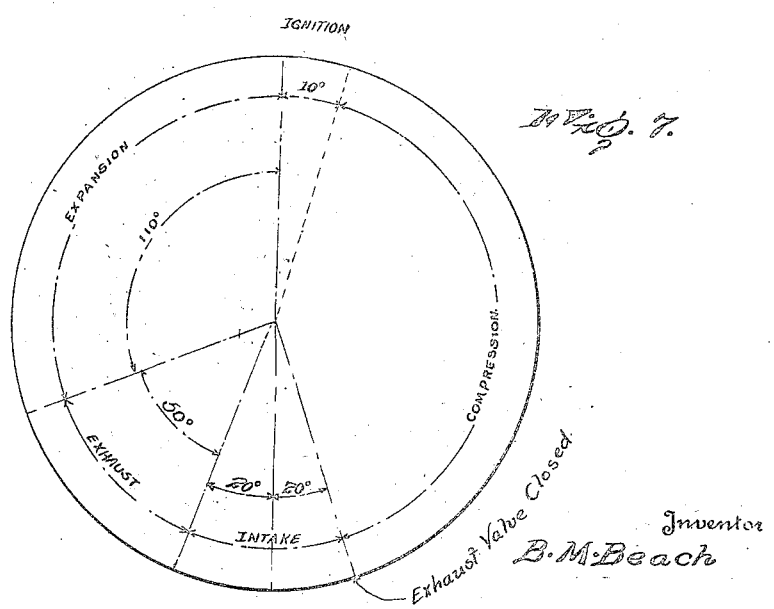

UNITED STATES PATENT OFFICE.

BERNARD M. BEACH, OF LIMA, OHIO.

INTERNAL-COMBUSTION ENGINE.

1,300,916.   Specification of Letters Patent.   Patented Apr. 15, 1919.

Application filed November 7, 1917. Serial No. 200,801.

*To all whom it may concern:*

Be it known that I, BERNARD M. BEACH, a citizen of the United States, residing at Lima, in the county of Allen and State of Ohio, have invented certain new and useful Improvements in Internal-Combustion Engines, of which the following is a specification.

This invention relates to an improved internal combustion engine of the rectilinear two-cycle type and has as its primary object to provide an engine of this character particularly adapted for use as an aviation motor.

The invention has as a further object to provide an engine which will effectually combine the elements of maximum power and consistent minimum weight.

A further object of the invention is to provide an engine wherein the cylinders thereof will be coupled in pairs and so connected that the piston of one cylinder of each pair will act to compress and deliver the fuel charge to the other cylinder of such pair and vice versa so that a working stroke of each piston will be had at each revolution of the motor.

The invention has as a further object to provide an arrangement wherein the pistons will control the intake of the fuel mixture to the explosion chambers of the cylinders and will also control the transfer of the fuel mixture from one cylinder to the other of the respective pairs.

And the invention has as a still further object to provide an engine of the above described character wherein a working impulse will be had at each thirty-six degrees of the revolution of the motor so that the flow of power will be practically continuous and even.

Other and incidental objects will appear as the description proceeds and in the drawings wherein I have illustrated the preferred embodiment of the invention and wherein similar reference characters designate corresponding parts throughout the several views:

Figure 1 is a side elevation particularly showing the arrangement of the cylinders upon the crank case of the engine, Fig. 2 is a sectional view illustrating the mounting of the cylinders upon the crank case;

Fig. 3 is a sectional view taken on the line 3—3 of Fig. 2 and looking in the direction of the arrows, this view illustrating the connection between the pistons and the crank shaft of the motor and also showing the arrangement of the push rods employed for opening the exhaust valves of the cylinders, Fig. 4 is a transverse sectional view taken on the line 4—4 of Fig. 3 and looking in the direction of the arrows, this view showing the transfer and receiving chambers of the respective pairs of cylinders, Fig. 5 is a transverse sectional view taken on the line 5—5 of Fig. 3 and looking in the direction of the arrows, this view particularly showing the intake passages at the inner ends of the cylinders, Fig. 6 is a sectional view particularly illustrating the type of cam ring employed for actuating the push rods of the cylinder exhaust valve, and Fig. 7 is a diagrammatic view showing the various positions of one of the working pistons of the motor during one complete revolution thereof in conjunction with the valve action of the motor.

In carrying out the invention, I employ a pentagonal crank case 10 in which, between the flat faces thereof, is formed longitudinally extending channels 11. The crank case is, as particularly shown in Fig. 3, formed in sections and projecting into the channels 11 are mating flanges 12 connected by bolts or other suitable fastening devices for securing the sections of the crank case together. Closing the extremities of the crank case are end plates 13 secured by a plurality of bolts 14 and projecting laterally from the outer sides of the said plates are spaced annular flanges 15. Overlying the outer edges of these flanges are terminal circular cap plates 16 secured to the outermost flanges 15 by a plurality of bolts 17. Fitted through the crank case is a crank shaft having alined portions 18 and 19 respectively, and oppositely disposed crank pins 20. The portion 18 of the crank shaft is hollow and serves as an intake for the fuel mixture and oil into the crank case. Detachably connected to the inner extremities of the crank pins 20 is a plate 21 secured in position by nuts 22 threaded upon the said pins. The crank shaft is thus formed in sections which are detachably connected by the plate 21. Fitted through the end plates 13 to surround the portions 18 and 19 of the crank shaft are bearing sleeves 23 provided with flanges 24 confronting the inner sides of the said plates and holding the said sleeves against outward movement. Fitted through the cap plates 16 to surround the alined portions of the crank shaft are similar bearing sleeves 25 provided with annular flanges 26 confronting the inner sides of the cap plates and holding the sleeves 25 against outward movement. Keyed or otherwise secured upon the crank shaft between the respective bearing sleeves are cam rings 27 and 28 respectively which lock the bearing sleeves 25 against inward movement. The said bearing sleeves will thus rotatably support the crank case upon the crank shaft.

Fitted through the flat faces of the crank case 10 are pairs of spaced working cylinders. Five pairs of such cylinders are employed and for convenience one cylinder of each pair is designated 29, while the other cylinder of each pair is designated 30. These cylinders are, at their inner extremities, formed with spaced annular flanges 31 between which are arranged to engage suitable flanges 32 upon the crank case for securely connecting the cylinders therewith. At the inner extremities of the cylinders, the crank case is, as shown in detail in Fig. 5 of the drawings, cut away to form intake passages 33 communicating with the intake ports 34 for the compression chambers of the said cylinders. Intermediate the ends thereof, the cylinders are offset and are thus enlarged at their inner extremities and formed around the said cylinders at the off-sets thereof, are annular passage-ways 35. These passage-ways are, as shown in Fig. 4, divided by transverse partition webs 36 to form a transfer chamber 37 and a receiving chamber 38 upon each of the cylinders. Entering through the bottom walls of the passage-ways 35 into each of the transfer chambers 37 are a plurality of transfer ports 39 and entering through the inner side walls of the receiving chambers 38 are a plurality of intake ports 40. It is now to be observed, as also shown in Fig. 4, that the chambers 37 and 38 of each pair of cylinders are reversely arranged and connecting the transfer and receiving chambers at corresponding sides of each pair of cylinders is a transfer pipe 41 while a similar transfer pipe 42 connects the transfer and receiving chambers at opposite corresponding sides of the cylinders of each pair.

Mounted to reciprocate within the several cylinders of the engine are a plurality of working pistons and for convenience, the pistons associated with the cylinders 29 have been indicated at 43 while the pistons associated with the cylinders 30 have been indicated at 44. At their inner terminals, the pistons are formed with enlarged compression heads 45 to move within the enlarged inner extremities of the cylinders which thus provide, as shall presently appear, compression chambers 46. The pistons 43 and 44 are hollow and screw threaded into the outer terminals thereof are plugs 47 upon which are swingingly mounted the connecting rods 48. The connecting rods of the pistons 43 are secured to a common bearing sleeve 49, while the connecting rods of the pistons 44 are secured to a similar sleeve 50. These sleeves are rotatably mounted upon the crank pins 20 and are held away from the plate 21 by spacing sleeves 51. Formed on the said sleeves are spaced annular flanges 52 between which the inner extremities of the connecting rods are received and pivotally connecting the said rods with the said flanges are a plurality of bolts or other suitable fastening devices 53. As will now be clear, the pistons 43 and 44 will thus be caused to reciprocate within the cylinders 29 and 30 as the motor revolves around the fixed crank shaft thereof.

Fitted into the outer ends of the cylinders 29 and 30 are valve cages 54. These valve cages are held in place by locking rings 55 screw threaded into the said cylinders and mounted upon the valve cages are suitable exhaust valves for the cylinders. For convenience, the exhaust valves of the cylinders 29 have been indicated at 56 while the exhaust valves for the cylinders 30 have been indicated at 57. These valves are normally held closed by suitable springs 58 arranged to surround the valve stems. Upstanding from the valve cages 54 are brackets 59 upon which are pivoted rocker arms 60 and 61 to engage the valve stems of the valves 56 and 57. Connected with the rocker arms 60 are valve rods 62 and connected with the rocker arms 61 are similar valve rods 63. Detachably secured to the inner ends of the rods 62 and 63 are push rods 62' and 63' respectively which are slidably received by sleeves 64 mounted upon the flanges 15 of the end plates 13 of the crank case. Interposed between the inner ends of the said sleeves and the inner terminals of the push rods are suitable springs surrounding the said rods and normally holding the rods 62' to coöperate with the cam ring 27 and the rods 63' to coöperate with the cam ring 28. The sleeves 64 serve to support the inner extremities of the push rods with respect to the cam rings 27 and 28 and in this connection, it is to be observed that the cap plates 16 are arranged to coöperate with the flanges of the end plates of the crank case to provide a housing for the sleeve bearings 23 and 25 of the crank shaft, the sleeves 64 and the inner ends of the push rods as well as for the cam rings 27 and 28. The ring 27 is, as shown in detail in Fig. 6, formed upon the lower side thereof with a cam 65 to coöperate with the push rods 62', while the ring 28 is formed upon its upper side with a similar cam 66 to coöperate with the push rods 63'. These cams are spaced 180 degrees apart with respect to one complete revolution of the motor and are adapted to actuate the valve rods 62 and 63 for opening the exhaust valves 56 and 57. At their outer extremities, the cylinders 29 provide explosion chambers 67 with which the intake ports 40 of the said cylinders communicate while the outer extremities of the cylinders 30 provide explosion chambers 68. The intake ports 40 of these latter cylinders, of course, also communicate with the explosion chambers thereof. Threaded through the walls of the said cylinders adjacent their outer extremities, are suitable spark plugs 69.

It is now to be noted that since the crank pins 20 are 180 degrees apart, the pistons 43 and 44 of each pair of the cylinders 29 and 30 will, as the motor revolves, always move in opposite directions and will always occupy a reverse position with respect to each other. This will be best understood upon reference to Fig. 7 of the drawings giving a diagram of the various positions of one of the pistons of the motor during one complete revolution thereof. Considered in connection with this diagram, the pistons 43 and 44 of each of the pairs of cylinders 29 and 30 will always be 180 degrees apart. In the interest of clarity, one pair of the pistons 43 and 44 in connection with one pair of the cylinders 29 and 30 will now be referred to. As the motor revolves to move the piston 43 to a position ten degrees in advance of compression dead center, the charge of fuel mixture in the explosion chamber 67 of the cylinder 29 will, as shown in Fig. 7, be fired. The cylinder will then move over the compression dead center of the piston when the exploded charge will expend against the piston during the next 110 degrees of rotary movement of the cylinder for revolving the crank case with respect to the crank shaft. The push rod 62' will then encounter the cam 65 upon the cam ring 27 for opening the exhaust valve 56 which will be held open during the ensuing ninety degrees of rotary movement of the cylinder 29 so that the exploded charge of fuel mixture will be hurled from the cylinder. Previous to the firing of the charge in the chamber 67 of the cylinder 29 and at a time when the said cylinder had reached a point twenty degrees in advance of compression dead center of the piston 43, the piston 44 would have been shifted inwardly to a position twenty degrees in advance of bottom dead center. In this position of the piston 44, the outer end thereof would uncover the intake ports 40 from the receiving chamber 38 of the cylinder 30 while the compression head 45 of the said piston would uncover the intake ports 34 from the crank case. Inward movement of the piston 44 would, of course, create a partial vacuum within the compression chamber 46 of the cylinder 30 so that as soon as the intake ports 34 were uncovered, a charge of fuel mixture would be drawn in through the passage 33 at the inner end of the cylinder into the said compression chamber. At the same time, as shall be later explained, a charge of fuel mixture would be introduced into the explosion chamber 68 of the cylinder 30 from the receiving chamber 38 thereof. When the cylinder 30 would have rotated thirty degrees beyond bottom dead center of the piston 44, the said piston would be shifted outwardly under the impulse of the explosion in the cylinder 29, to close the intake ports 34 and 40 of the said cylinder and compress a charge of fuel mixture within the compression chamber 46 thereof. When, during the compression of the charge in the chamber 46 of the cylinder 30, the piston 43 of the cylinder 29 had reached a position twenty degrees in advance of bottom dead center, the outer end of this piston would uncover the intake ports 40 from the receiving chamber 38 of the said cylinder while the compression head 45 of the piston would uncover the intake ports 34 of the cylinder. Previous inward movement of the piston 43 would, of course, create a partial vacuum within the compression chamber 46 of the cylinder 29 so that a charge of fuel mixture would consequently then be drawn into the said compression chamber from the crank case while the piston 44, in its outward movement, would force a compressed charge of fuel mixture from the compression chamber 46 of the cylinder 30 through the receiving chamber 37 of the said cylinder, through the transfer pipe 42 and into the receiving chamber 38 of the cylinder 29 to be then delivered into the explosion chamber 67 of this latter cylinder. When the piston 44 of the cylinder 30 had reached a point ten degrees in advance of compression dead center, the charge of fuel mixture in the explosion chamber 68 of the said cylinder would be fired to revolve the crank case about the crank shaft and in this connection, it is to be observed that the firing of the cylinder 30 would occur at a point 180 degrees after the firing of the cylinder 29. The exploded charge in the chamber 68 would then expand against the piston 44 during the next 110 degrees of the rotary movement of the cylinder 30 when the push rod 63' would encounter the cam 66 of the cam ring 28 for opening the exhaust valve 57. This valve would then be held open during the ensuing ninety degrees of rotary movement of the cylinder 30 so that the exploded charge would be hurled from the said cylinder. The piston 44 would then again have assumed a position to open the intake ports 40 from the receiving chamber 38 of the said cylinder as well as the intake ports 34 from the crank case to the compression chamber of the cylinder. As the exploded charge in the chamber 68 of the cylinder 30 expanded against the piston 44, the piston 43 would, upon reaching a position twenty degrees beyond bottom dead center thereof, move outwardly within the cylinder 29 to close the intake ports 34 from the compression chamber 46 of the said cylinder as well as also close the intake ports 40 from the receiving chamber 38 of the cylinder. Continued outward movement of the piston 43, would then, of course, compress the fuel charge within the compression chamber of the cylinder 29 as well as compress the fuel charge within the compression chamber 67 of the said cylinder. Consequently, when the piston 44 of the cylinder 30 had reached the position to open the intake ports 40 of this cylinder, the piston 43 would act to force a compressed charge of fuel mixture into the transfer chamber 37 of the cylinder 29 through the transfer pipe 41 and into the receiving chamber 38 of the cylinder 30 to be then delivered into the explosion chamber 68 of this latter cylinder. When the cylinder 29 then reached a position ten degrees in advance of compression dead center of the piston 43, the compressed charge of fuel mixture in the chamber 67 of the said cylinder would then again be fired. As intimated, the exhaust valve 56 of the cylinder 29 will be held open until the piston 43 reaches a position 20 degrees beyond bottom dead center. In like manner, the exhaust valve 57 will be held open until the piston 44 reaches a position 20 degrees beyond bottom dead center. Consequently, back pressure tending to retard the incoming fresh charge to each cylinder cannot occur.

It will therefore be seen that as the motor revolves, one piston of each pair of cylinders will, upon each complete revolution of the motor, act to draw in, compress, and deliver, a charge of fuel mixture into the explosion chamber of the other cylinder of such pair, and vice versa so that a working stroke of each piston of each pair will be had at each complete revolution of the motor. Therefore, since five pairs of the cylinders 29 and 30 are employed, one of the pistons of the several pairs will deliver a working stroke at each thirty-six degrees of revolution of the motor so that the flow of power will thus be practically continuous and even. At the same time, the structure of the motor is such that the motor will be of very light weight and in thus combining a maximum of power with a minimum of weight, I consequently provide a motor particularly adapted for aviation purposes.

Having thus described the invention, what is claimed as new is:

1. An internal combustion engine including a fixed crank shaft, a crank case mounted to revolve upon the crank shaft, a pair of cylinders connected with the crank case and provided with compression and explosion chambers, exhaust ports for the said cylinders, transfer and receiving chambers upon each cylinder, the transfer chambers communicating with the compression chambers of the cylinders and the receiving chambers communicating with the explosion chambers, means connecting the transfer chamber of each cylinder with the receiving chamber of the other cylinder, intake ports for the said compression chambers, and pistons mounted to reciprocate within said cylinders and connected to the crank shaft, the said pistons being movable to open and close said intake ports and deliver a charge of fuel mixture from the compression chamber of each cylinder into the transfer chamber thereof to be delivered into the receiving chamber of the other cylinder and thence introduced into the explosion chamber of the latter cylinder at each revolution of the crank case.

2. An internal combustion engine including a fixed crank shaft, a crank case mounted to revolve upon the crank shaft, a pair of cylinders connected with the crank case and provided with compression and explosion chambers, transfer and receiving chambers formed on the cylinders, the transfer chambers communicating with the compression chambers, intake ports between the receiving chambers and the explosion chambers, intake ports for the compression chambers, means connecting the transfer chamber of each cylinder with the receiving chamber of the other cylinder, and pistons mounted to reciprocate within the said cylinders and connected to the crank shaft, the said pistons being movable to uncover and cover said ports for drawing in a charge of fuel mixture into the compression chamber of each of the cylinders and delivering a fuel charge from the compression chamber of each cylinder into the transfer chamber thereof and thence into the receiving chamber of the other cylinder to be introduced into the explosion chamber of the latter cylinder through the said first mentioned intake ports at each revolution of the crank case.

3. In an internal combustion engine of the character described, a fixed crank shaft, a crank case revoluble thereon, a pair of cylinders carried by the crank case and provided with compression and explosion chambers, transfer and receiving chambers formed on the said cylinders, the transfer chamber of each cylinder being connected with the receiving chamber of the other, intake ports from the receiving chambers to the explosion chambers, intake ports from the crank case to the compression chambers, the compression chambers communicating with the said transfer chambers, and pistons mounted to reciprocate within the said cylinders and connected to the crank shaft for uncovering and covering said intake ports and controlling the flow of fuel mixture from the compression chambers to the explosion chambers through said transfer and receiving chambers.

4. An internal combustion engine including a fixed crank shaft, a crank case, end plates carried by the crank case, bearings mounted upon said end plates and receiving the crank shaft, flanges formed on the end plates, cap plates connected to said flanges, bearings carried by said cap plates and coöperating with said first mentioned bearings for rotatably supporting the crank case upon the crank shaft, cylinders connected to the crank case, pistons mounted to reciprocate within the said cylinders and connected to the crank shaft, intake ports for the cylinders arranged to be opened and closed by the said pistons, exhaust valves for the cylinders, sleeves mounted upon the flange of one of said end plates, push rods slidable through said sleeves and operatively connected with the said exhaust valves for actuating the said valves, and a cam ring fixed upon the crank shaft between adjacent bearings of the said end and adjacent cap plate and provided with a cam to engage the said push rods for opening the said exhaust valves.

5. An internal combustion engine including a fixed crank shaft having opposed crank pins, a crank case revoluble upon the crank shaft, a pair of cylinders mounted upon the crank case and offset at their inner extremities to provide compression chambers, passage-ways extending around the cylinders at the offsets thereof, partitions within the said passage-ways defining a transfer chamber and receiving chamber upon each of the cylinders, the said cylinders at their outer extremities providing explosion chambers, intake ports between the receiving chambers of the cylinders and the said explosion chambers, intake ports from the crank case into the said compression chambers, the transfer chambers communicating with the said compression chambers, means connecting the transfer chamber of each cylinder with the receiving chamber of the other cylinder, and pistons mounted to reciprocate within the said cylinders and respectively connected to the said crank pins, the said pistons being movable to open and close said ports and to deliver a charge of fuel mixture from the compression chamber of each cylinder into the explosion chamber of the other cylinder through the said transfer and receiving chambers at each revolution of the crank case.

6. In engine construction, a fixed crank shaft, a crank case revoluble about the crank shaft, spaced pairs of cylinders mounted upon the crank case and formed with compression and explosion chambers, the cylinders of each pair being disposed in a plane parallel to the axis of the crank case, means connecting the compression chamber of each cylinder of each pair with the explosion chamber of the other cylinder of each pair, intake ports for the compression chamber, pistons reciprocable in each pair of cylinders and connected with the crank shaft, the pistons being movable to control the delivery of a fuel charge from the compression chamber of one cylinder of each pair to the explosion chamber of the other cylinder of each pair, and means operable from the crank shaft independently of the pistons for alternately exhausting the cylinders of each pair at each half revolution of the crank case.

7. In engine construction, a fixed crank shaft, a crank case revoluble thereon, a pair of cylinders carried by the crank case and provided with compression and explosion chambers, transfer and receiving chambers extending circumferentially of each of the said cylinders to be heated from the walls thereof, the transfer chamber of each cylinder being connected with the receiving chamber of the other cylinder, intake ports from the receiving chambers to the explosion chambers, intake ports for the compression chambers, the compression chambers communicating with the transfer chambers, and pistons mounted to reciprocate within the said cylinders and connected to the crank shaft for opening and closing said intake ports and controlling the flow of fuel mixture from the compression chambers to the explosion chambers through said transfer and receiving chambers.

8. In engine construction, a fixed crank shaft, a crank case revoluble thereon, a pair of cylinders carried by the crank case and provided with compression and explosion chambers, a passageway extending circumferentially of each of the cylinders to be heated therefrom, partitions within the said passageways defining a transfer chamber and a receiving chamber upon each of the cylinders, the transfer chamber of each cylinder being connected with the receiving chamber of the other cylinder, intake ports from the receiving chambers to the explosion chambers, intake ports for the compression chambers, the compression chambers communicating with the said transfer chambers, and pistons mounted to reciprocate within the said cylinders and connected to the crank shaft for opening and closing said intake ports and controlling the flow of fuel mixture from the compression chambers to the explosion chambers through said transfer and receiving chambers.

9. In engine construction, a fixed crank shaft, a crank case revoluble thereon, end plates carried by the crank case, flange formed on one of the end plates, a cap plate connected to said flange and coöperating with said end plate to provide a housing, cylinders connected with the crank case, pistons mounted to reciprocate within the said cylinders and connected to the crank shaft, intake and exhaust ports for the said cylinders, exhaust valves controlling flow through the exhaust ports, a cam ring fixed upon the crank shaft within the said housing, push rods extending into the housing and coöperating with the said cam ring for actuating the said valves, and yieldable means associated with the said push rods within the said housing, for holding the push rods in contact with the said cam ring.

10. In engine construction, a fixed crank shaft, a crank case revoluble thereon, end plates carried by the crank case, flanges formed on one of said end plates, a cap plate connected to said flange and coöperating with said end plate to provide a housing, cylinders connected with the crank case, pistons mounted to reciprocate within the said cylinders and connected to the crank shaft, intake and exhaust ports for the cylinders, exhaust valves controlling flow through the exhaust ports, and push rods slidably received through said flange into the said housing to coöperate with the cam ring for actuating the exhaust valves therefrom.

11. In engine construction, a fixed crank shaft, a crank case revoluble thereon, a pair of cylinders carried by the crank case, and each provided with a compression and explosion chamber, transfer and receiving chambers extending circumferentially of each of the cylinders at the junction of the said first mentioned chambers thereof, the transfer chamber of each cylinder being connected with the receiving chamber of the other, intake ports from the receiving chambers to the explosion chambers, intake ports for the compression chambers, the compression chambers communicating with the transfer chambers, and pistons mounted to reciprocate within the said cylinders and connected to the crank shaft for opening and closing said intake ports and controlling the flow of fuel mixture from the compression chambers to the explosion chambers through said transfer and receiving chambers.

12. An internal combustion engine including a fixed crank shaft, a crank case revoluble thereon, a pair of cylinders carried by the crank case and provided with compression and explosion chambers, intake ports for the explosion chambers, means connecting the compression chamber of each cylinder with the explosion chamber of the other cylinder and communicating with said intake ports, fuel intake ports opening from the crank case into the compression chambers, and pistons mounted to reciprocate within said cylinders and connected to the crank shaft, said pistons being movable to open and close said intake ports and deliver a charge of fuel mixture from the compression chamber of each cylinder into the explosion chamber of the other cylinder at each revolution of the crank case.

In testimony whereof I affix my signature.

BERNARD M. BEACH. [L. S.]